(12) United States Patent
Martin et al.

(10) Patent No.: US 8,317,239 B2
(45) Date of Patent: Nov. 27, 2012

(54) FLIP-UP BUMPER ASSEMBLY

(75) Inventors: Bryan E. Martin, Quapaw, OK (US); Brice E. Martin, Quapaw, OK (US)

(73) Assignee: Four State International Trucks, Inc., Joplin, MO (US)

( * ) Notice: Subject to any disclaimer, the term of this patent is extended or adjusted under 35 U.S.C. 154(b) by 218 days.

(21) Appl. No.: 12/765,047

(22) Filed: Apr. 22, 2010

(65) Prior Publication Data
US 2011/0260477 A1 Oct. 27, 2011

(51) Int. Cl.
*B60R 19/38* (2006.01)

(52) U.S. Cl. .......................... 293/118; 293/102

(58) Field of Classification Search .................. 293/102, 293/118, 120
See application file for complete search history.

(56) References Cited

U.S. PATENT DOCUMENTS

| | | | | |
|---|---|---|---|---|
| 1,415,518 | A * | 5/1922 | Buck | 293/34 |
| 4,514,002 | A * | 4/1985 | McIntosh | 293/118 |
| 4,582,351 | A * | 4/1986 | Edwards | 293/118 |
| 4,641,871 | A * | 2/1987 | Vaughn | 293/118 |
| 5,199,755 | A * | 4/1993 | Gertz | 293/120 |
| 5,520,428 | A * | 5/1996 | Bell | 293/118 |
| 5,782,514 | A * | 7/1998 | Mann | 293/118 |
| 6,764,116 | B2 * | 7/2004 | Ledford et al. | 293/102 |
| 6,764,118 | B2 * | 7/2004 | DePottey et al. | 293/118 |
| 6,834,899 | B2 * | 12/2004 | Lindsey | 293/118 |
| 6,923,326 | B2 * | 8/2005 | Lackey et al. | 206/736 |
| 6,962,378 | B2 * | 11/2005 | Ledford et al. | 293/102 |
| 6,974,166 | B2 * | 12/2005 | Ledford et al. | 293/102 |
| 7,086,673 | B2 * | 8/2006 | Connett et al. | 293/118 |
| 7,188,875 | B2 * | 3/2007 | Norelius | 293/128 |
| 7,325,848 | B2 * | 2/2008 | Joseph et al. | 293/115 |
| 7,530,612 | B2 * | 5/2009 | Regnell et al. | 293/118 |
| 8,070,196 | B2 * | 12/2011 | Couto et al. | 293/118 |
| 2011/0260477 | A1 * | 10/2011 | Martin et al. | 293/118 |

FOREIGN PATENT DOCUMENTS

JP      406270750      * 9/1994

* cited by examiner

*Primary Examiner* — Glenn Dayoan
*Assistant Examiner* — Gregory Blakenship
(74) *Attorney, Agent, or Firm* — Husch Blackwell LLP (57) ABSTRACT

A flip-up bumper assembly for a motor vehicle having a at least one attachment assembly, a support member, a bumper frame, a lift height adjustment member, an extendable member. Additionally, the flip-up bumper assembly may further include a variable height bumper frame and/or a pivot member. The flip up bumper assembly is generally coupled to the motor vehicle. The bumper frame is operably connected to the support member wherein the bumper frame rotates about a pivot point on the support member. The extendable member is coupled to both the attachment member and the bumper frame. The extendable member extends in a generally horizontal direction and causes the bottom of the bumper frame to angularly deflect about the pivot point, resulting in an outward and upward translation. The variable height flip-up bumper assembly of the present invention allows for the use of a plurality of bumper sizes as selected by the vehicle owner. The flip-up bumper assembly of the present invention also allows the installer or owner of the assembly to select from multiple bumper lift heights.

12 Claims, 7 Drawing Sheets

FLIP-UP BUMPER ASSEMBLY

CROSS-REFERENCE TO RELATED APPLICATIONS

None

BACKGROUND OF THE INVENTION

Owners and operators of motor vehicles often desire to improve both the performance and appearance of their motor vehicles. For example, many motor vehicle owners replace the vehicle's Original Equipment Manufacturer's ("OEM") bumper and replace it with an aftermarket model that improves the appearance of the vehicle, the aerodynamics of the vehicle, and sometimes both. To improve aerodynamics, aftermarket bumpers are often deeper, in order to provide a reduced ground clearance. However, one real disadvantage of using a fixed aftermarket bumper with low ground clearance is that it will inevitably be damaged by obstacles during off-road travel, driving over curbs, speed bumps, or other like obstacles. In addition, even OEM bumpers may be vulnerable to damage from these obstacles depending on the operating environment.

Accordingly, a need exists in the art to provide a flip-up bumper assembly that allows motor vehicle owners to realize the benefits of an aftermarket or OEM bumper while protecting the monetary investment in the bumper, and maintaining the aerodynamic and aesthetic benefits by allowing the motor vehicle operator to flip-up the bumper as a preventative measure when traveling off-road or over obstacles.

SUMMARY OF THE INVENTION

A flip-up bumper assembly for a motor vehicle is provided that includes at least one attachment assembly, a support member, a bumper frame, a lift height adjustment means, and an extendable member. Additionally, the flip-up bumper assembly may further include a bumper adaption means and/or a pivot member. The at least one attachment assembly is coupled to the front end of the motor vehicle. The support member is coupled to at least one of the attachment assemblies. The bumper frame is operably connected to the support member wherein the bumper frame rotates about a point on the support member. The extendable member is coupled to both the attachment assembly and the bumper frame. The extendable member extends in a generally horizontal direction and causes the bottom of the bumper frame to angularly deflect about the pivot point resulting in both upward and outward translation of the bumper. A lift height adjustment means is coupled to the bumper frame and allows a user to select from multiple flip-up heights using the same horizontal translation of the extendable member in this one invention. Finally, a bumper adaption means is utilized with the bumper frame to facilitate using a universal flip-up bumper assembly that can support bumpers having different depths.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawings.

Figure 5:
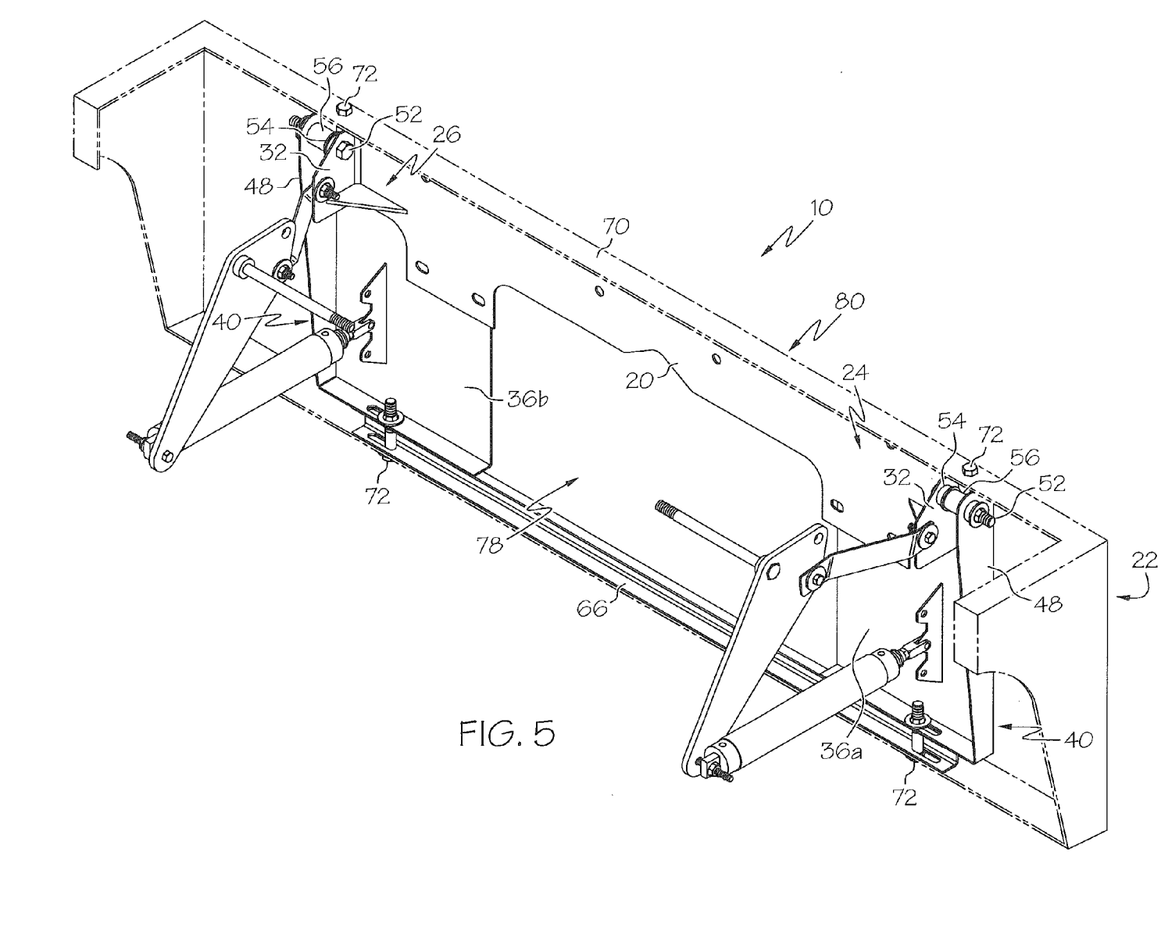
FIG. 5 is a rear perspective view of a flip-up bumper assembly according to an embodiment of the present invention including an aftermarket bumper (shown in broken lines) and a bumper adaption means utilized therewith.

Turning to FIGS. 1-3 and 5-7, reference numeral 10 designates generally a flip-up bumper assembly for a motor vehicle (not shown) wherein flip-up bumper assembly 10 may include a pair of trapezoidal shaped connection plates 12, two frame bolts 16, a pair of link bars 14, a plate beam 20, a bumper frame 36, a pair of air cylinders 58, and at least one lift height adjustment plate 38. Flip-up bumper assembly 10 may also include at least one pivot bolt 52, and/or a bumper adaption channel 66. Flip-up bumper assembly 10 receives a bumper 22 as shown in FIG. 5.

FIGS. 1-3 and 5-7 generally demonstrates an embodiment of the present invention wherein connection plate 12 and link bar 14 are operably connected and function together. Further, in this embodiment, connection plate 12 and link bar 14 generally lie in an approximately inverted "L" shape with connection plate 12 in a generally vertical position and link bar 14 in a generally horizontal position extending toward the front-end of a vehicle (not shown).

Figure 2:
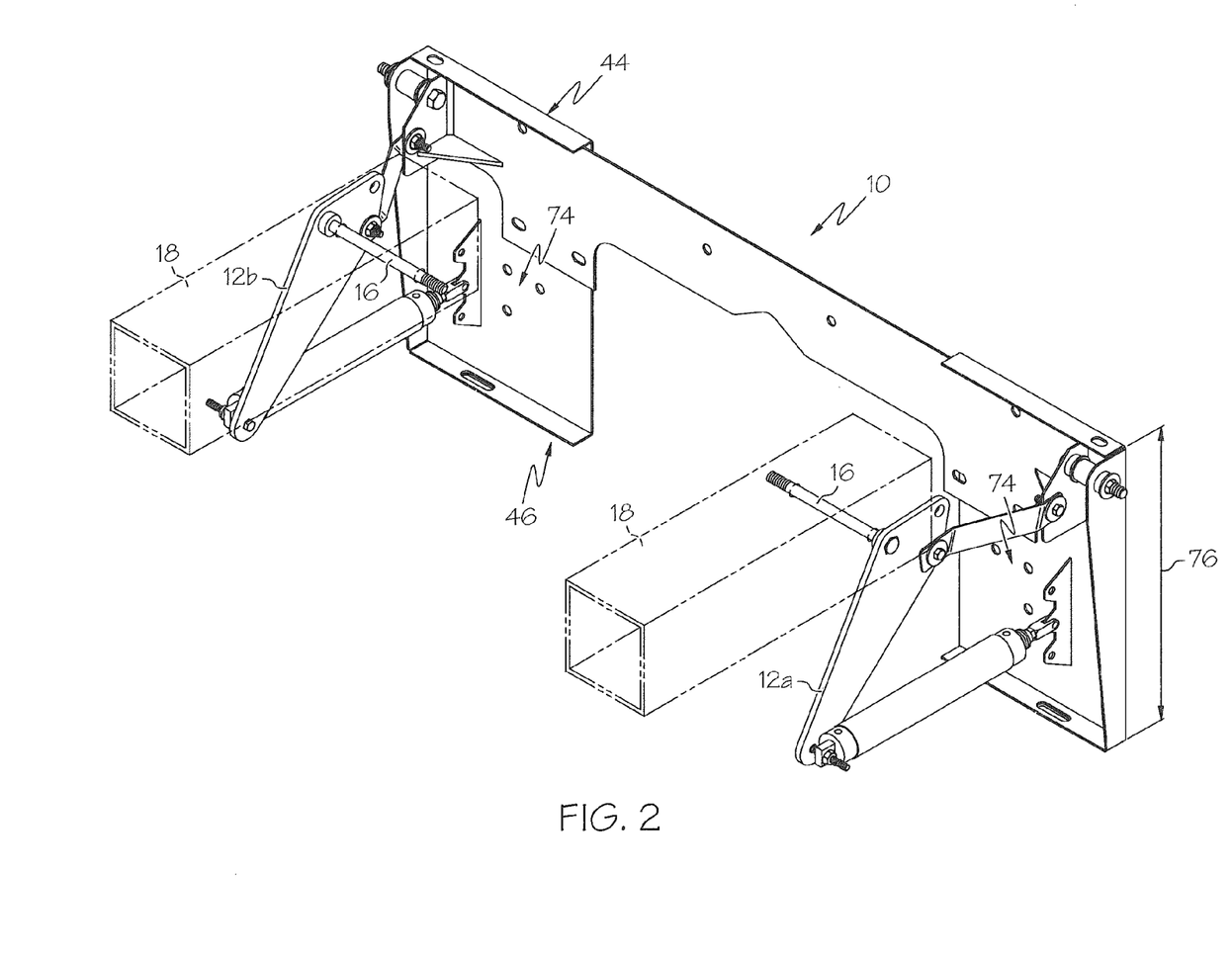
FIG. 2 is a rear perspective view of a flip-up bumper assembly according to an embodiment of the present invention operably connected to a motor vehicle frame.

Frame bolt 16 generally couples flip-up bumper assembly 10 to a structural component of the vehicle. FIG. 2 demonstrates frame bolt 16 coupling both right connection plate 12a and left connection plate 12b to the fore-end of a vehicle frame 18. Alternatively, coupling of flip-up bumper assembly 10 to a structural component of a vehicle 18 may be achieved using rivets, clamps, compression assemblies, welds, sleeves, magnets, screws, threaded studs, any other coupling techniques known in the art, or any combination thereof to couple attachment bracket to vehicle frame 18.

Figure 3:
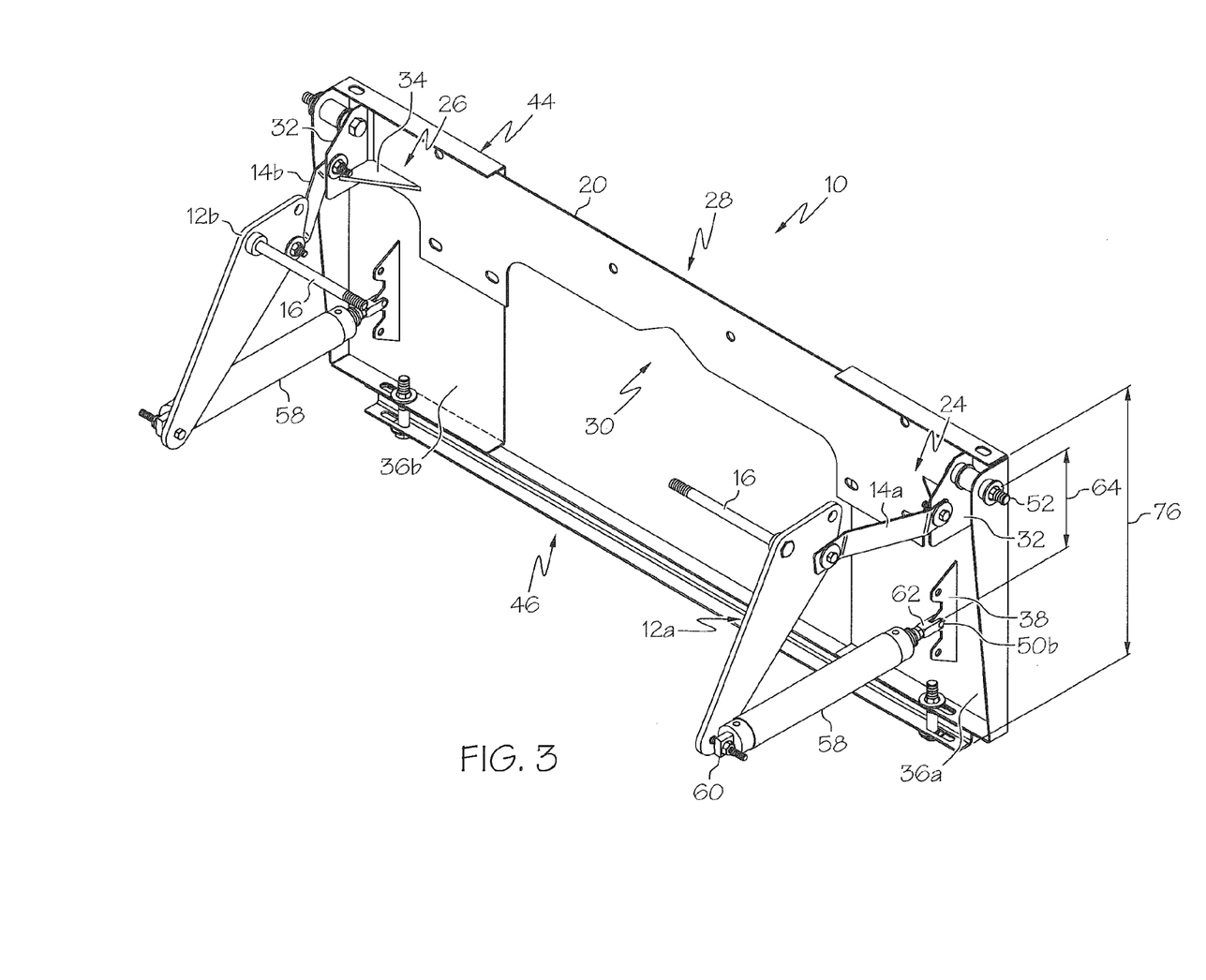
FIG. 3 is a rear perspective view of a flip-up bumper assembly according to an embodiment of the present invention.

As shown in FIG. 3, plate beam 20 lies in a generally horizontal plane and as seen from the rear as in FIG. 3, it has a right end 24, a left end 26, a top side 28 and a bottom side 30, wherein plate beam 20 is a steel plate cut-out having a vertically orientated and relatively narrow profile. Each end 24, 26 of plate beam 20 includes a return plate 32 orientated generally transverse to plate beam 20 extending toward the back-end of the vehicle and a stiffener gusset 34 reinforces return plate 32 of plate beam 20. A person skilled in the art will recognize a variety of structural shapes including, but not limited to a tube, angle, bar stock, channel, or I-beam could be utilized in place of plate beam 20. Additionally, the function of plate beam 20 may also be achieved with an alternative construction including at least two structural shapes coupled generally into a frame. FIG. 3 demonstrates one embodiment of the present invention wherein plate beam 20 is coupled to link bar 14. Specifically in the embodiment shown, right link bar 14a is coupled to return plate 32 at right end 24 of plate beam 20 and left link bar 14b is coupled to return plate 32 at left end 26 of plate beam 20.

FIG. 3 also illustrates one embodiment wherein right end 24 and left end 26 of plate beam 20 are configured to extend beyond the distance between right connection plate 12a and left connection plate 12b. FIG. 3 also illustrates that right link bar 14a and left link bar 14b are bent to accommodate this offset. A bend in link bar 14 may be utilized in embodiments wherein the length of plate beam 20 is greater or less than the distance between right connection plate 12a and left connection plate 12b. Alternatively, link bars 14a,b do not need to be bent when the length between right end 24 and left end 26 of plate beam 20 is the same distance as the distance between right connection plate 12a and left connection plate 12b and plate beam 20 is positioned such that ends 24, 26 line up with the connection plates 12a,b.

Figure 4:
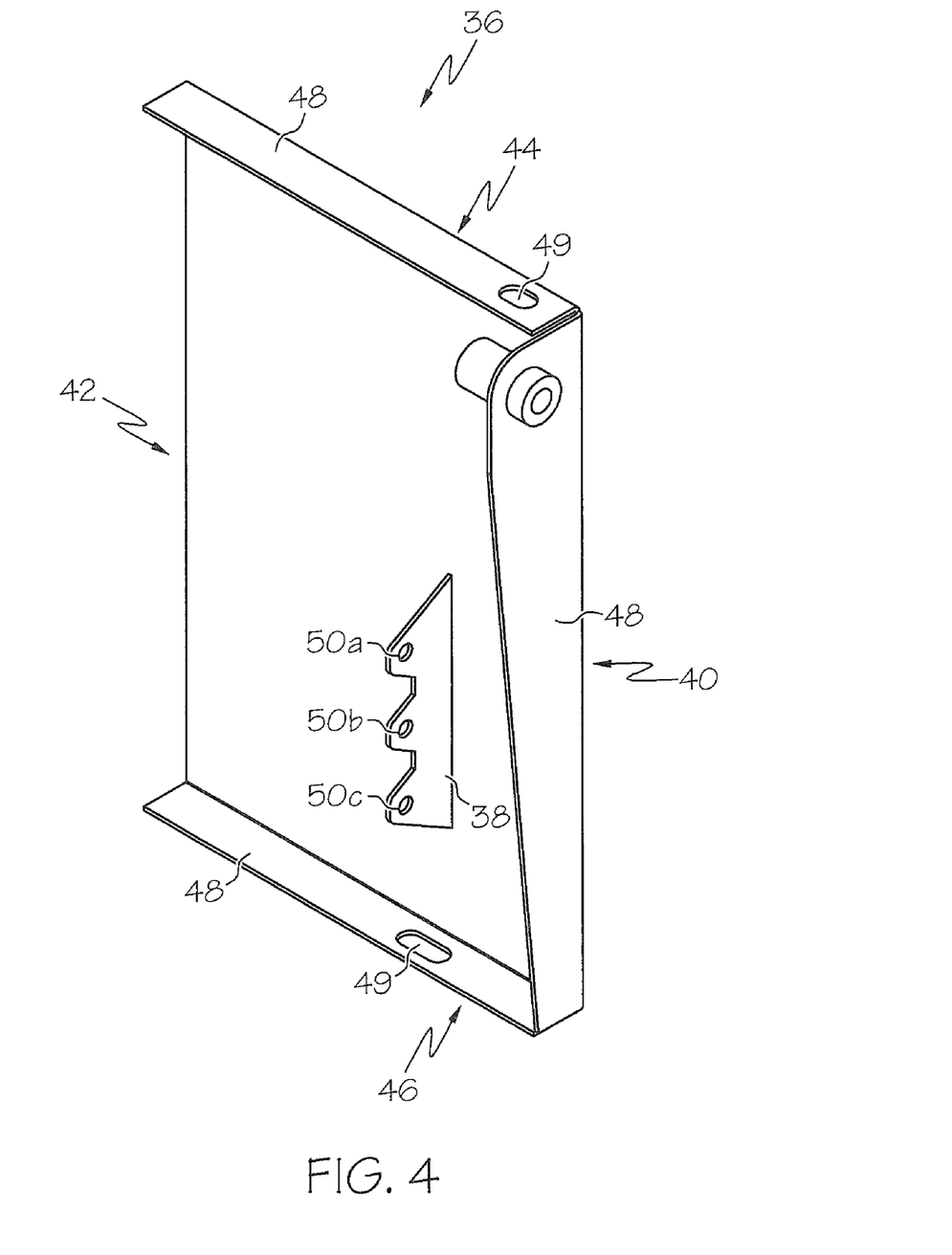
FIG. 4 is a rear perspective view of a right bumper connection bracket according to an embodiment of the present invention demonstrating the lift height adjustment means and a right lift height adjustment plate with three vertically orientated attachment positions.

As shown in FIG. 3, one embodiment of bumper frame 36 including two bumper connection brackets 36—a right bumper connection bracket 36a and a left bumper connection bracket 36b. FIG. 4 further shows a bumper connection bracket 36 with a lift height adjustment plate 38 coupled to bumper connection bracket 36 wherein lift height adjustment plate 38 includes three (3) vertically orientated attachment positions 50a,b,c. Bumper connection bracket 36 is generally rectangular in shape with an outward side 40, an inward side 42, a top side 44, a bottom side 46 and a vertical height 76. FIGS. 2 and 3 illustrate that vertical height 76 is the distance between the edge of top side 44 and the edge of bottom side 46. Referring back to FIG. 3, top side 44, bottom side 46, and outward side 40 of bumper connection bracket 36 include a flange 48. Flange 48 stiffens the bumper connection bracket 36 and provides an area to operably connect bumper connection bracket 36 to plate beam 20 at or near top side 44 of bumper connection bracket 36. Bumper connection bracket 36 may include top and bottom bumper attachment slots 49 to facilitate the attachment of bumper 22. The location of bumper attachment slots 49 will generally correspond with the designs of the OEM bumper and aftermarket bumpers. FIG. 4 shows bumper attachment slots 49 in flange 48 of top side 44 and in flange 48 of bottom side 46 of bumper connection bracket 36. Alternatively, bumper frame is not limited to right and left bumper connection brackets 36a,b, and could be any frame which receives bumper 22 (FIG. 5), operably connects to plate beam 20, and may further include lift height adjustment plate 38. Bumper frame 36 can be constructed with any structurally adequate shape as known in the art, including plates, bar stock, tube, channel, or angle shapes.

Generally, bumper frame 36 is operably connected to plate beam 20 allowing for relative rotation between the two. FIG. 5 illustrates an embodiment of the present invention wherein flange 48 of outward side 40 of right and left bumper connection brackets 36a,b is operably connected to return plate 32 of both right and left ends 24, 26 of plate beam 20 by pivot bolt 52 in concert with a washer 54 and a spacer 56. Alternative to the use of pivot bolt 52, there are many hinge-like assemblies known in the art that can operably connect bumper frame 36 to plate beam 20.

Figure 6:
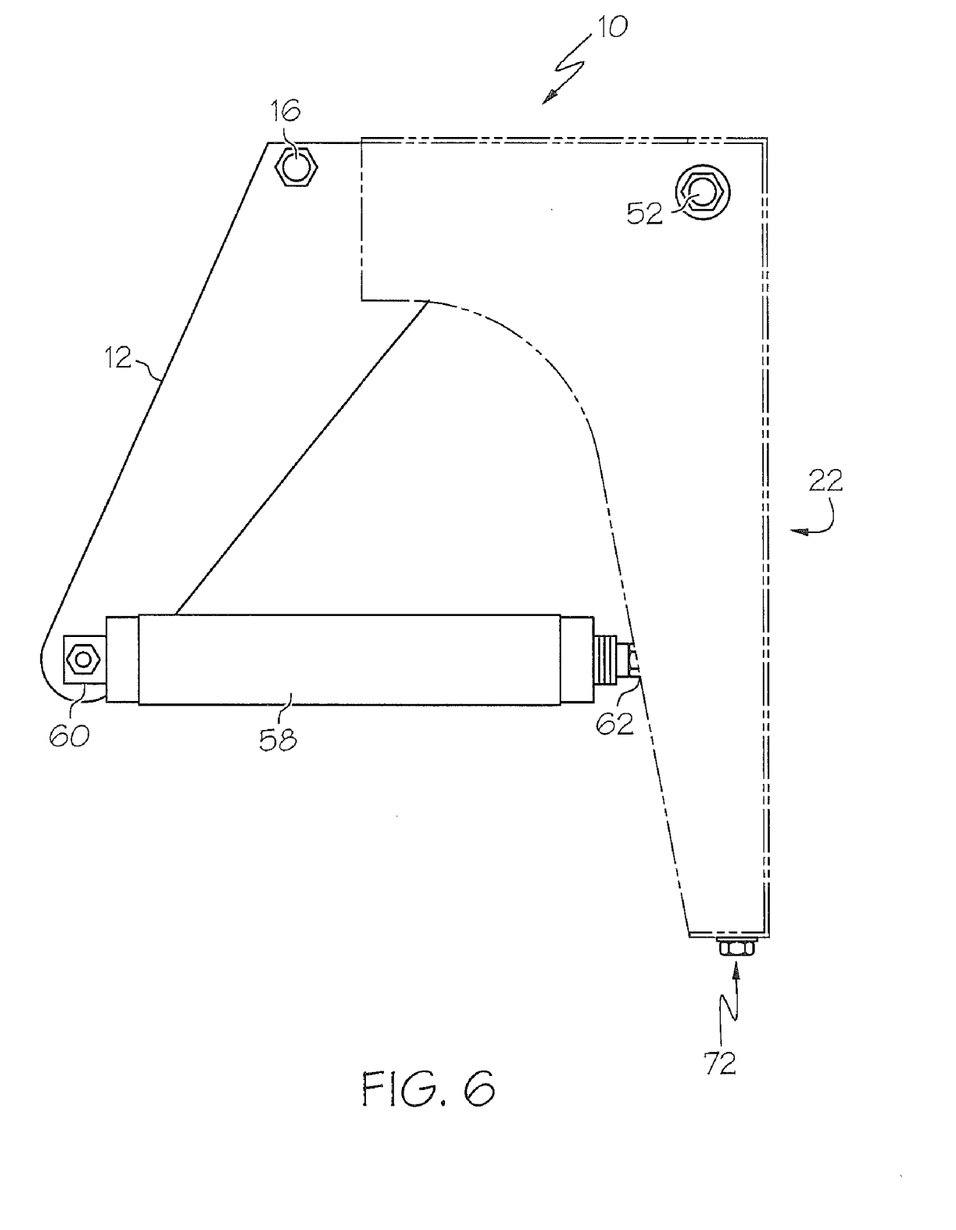
FIG. 6 is a side elevational view of the flip-up bumper assembly operably connected to a bumper (shown in broken lines) in a lowered position according to an embodiment of the present invention.
Figure 7:
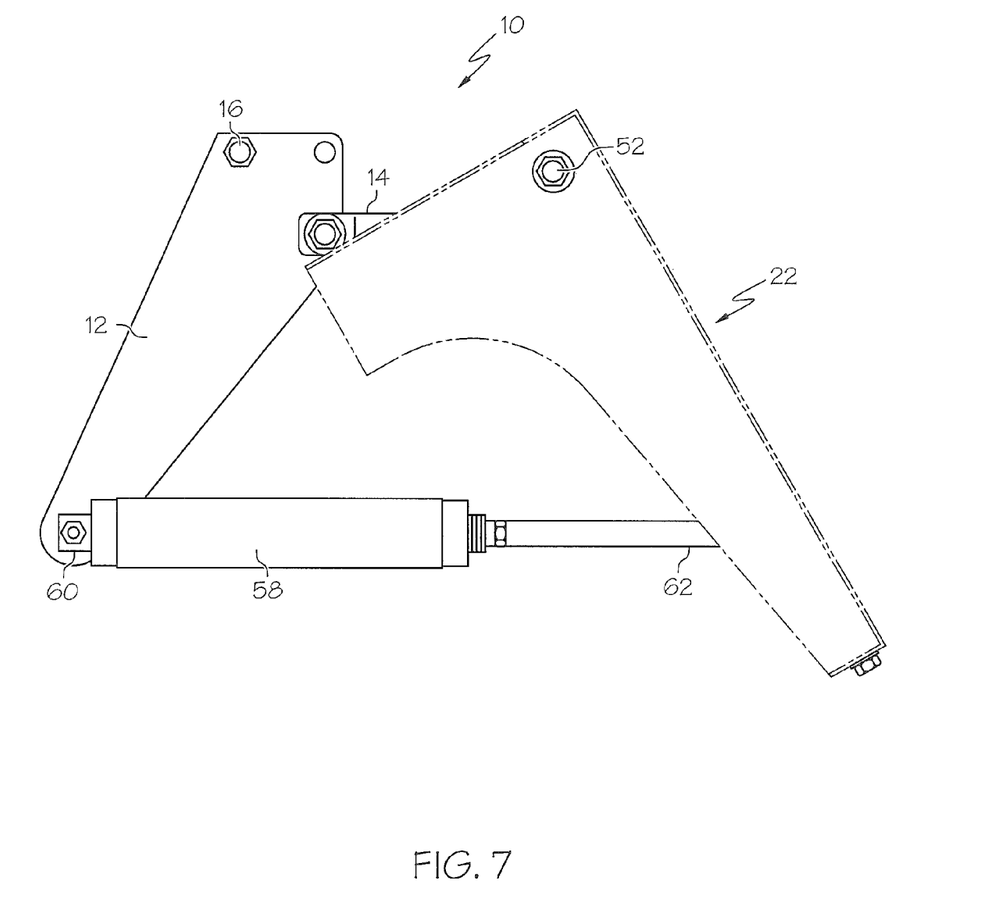
FIG. 7 is a side elevational view similar to FIG. 6 of the end of the flip-up bumper assembly operably connected to a bumper in a raised position according to an embodiment of the present invention.

FIGS. 1, 3, 6 and 7 demonstrates an embodiment of the present invention including air cylinder 58 having a first end 60 and a second end 62 wherein air cylinder 58 is actuated to "flip up" the bottom of bumper 22. As best seen in the embodiment shown in FIG. 3, first end 60 of air cylinder 58 is operably connected using a bolt to connection plate 12 and second end 62 of air cylinder 58 is operably connected using a pin or a bolt to attachment position 50b of lift height adjustment plate 38. FIG. 6 shows an embodiment of the present invention wherein second end 62 is in a retracted position resulting in bumper 22 being in a lowered position. FIG. 7 similarly shows the same embodiment wherein second end 62 is in a fully extended position resulting in bumper 22 being in a raised, "flipped up," position.

Generally, at least one air cylinder 58 provides the "flip-up" of bottom of bumper 22 through a generally horizontal uniform translation of extending second end 62 that angularly displaces the bottom of bumper 22 about pivot bolt 52 resulting in outward and upward translation of the bottom of bumper 22. The embodiment of the present invention shown in FIGS. 2, 3, and 5 includes two air cylinders. Alternatively, a hydraulic cylinder, scissor arm, cam mechanism or telescoping arm or any other mechanism that manually or automatically provides a generally horizontal uniform translation may be utilized in place of air cylinder 58 in the present invention.

Figure 1:
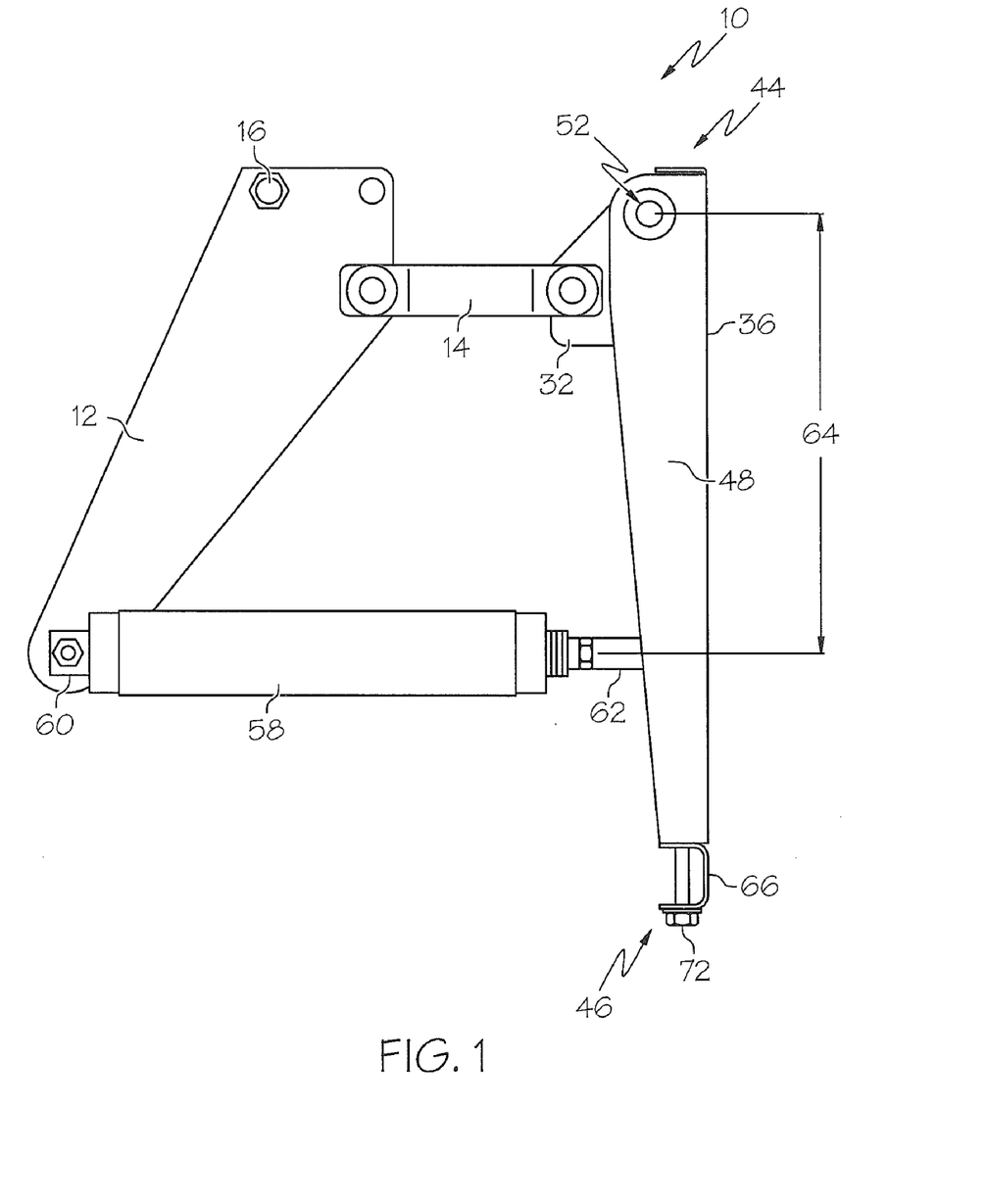
FIG. 1 is a side elevational view of the flip-up bumper assembly according to an embodiment of the present invention with no bumper attached.

Lift height adjustment plate 38 allows multiple bumper lift heights to be provided by flip-up bumper assembly 10. FIG. 4 illustrates lift height adjustment plate 38. In this embodiment, lift height adjustment plate 38 is vertically orientated and one lift height adjustment plate is welded to right and left bumper connection brackets 36a,b respectively. Further, each lift height adjustment plate 38 includes three (3) vertically orientated attachment positions 50a,b,c that are able to receive the second end 62 of air cylinder 58. Second end 62 of air cylinder 58 may be operably connected to lift height adjustment plate 38 at either one of vertically orientated attachment positions 50a, 50b, or 50c. FIGS. 1 and 3, as viewed together, demonstrate that each vertically orientated attachment position will provide a different radial arm 64 for rotation about pivot bolt 52. The horizontal and vertical translation of the bottom of bumper frame 36 and bumper 22 is increased using the same horizontal translation distance of second end 62 of air cylinder 58 with a shorter radial arm 64. Thus, the embodiment demonstrated in FIG. 1 permits the vehicle owner to select between three (3) flip-up heights by coupling second end 62 of air cylinder 58 at either of three vertically orientated attachment positions 50a, 50b, or 50c.

Generally a lift height adjustment plate 38 including at least two vertically orientated attachment positions 50 that receive second end 62 of air cylinder 58 is within the scope of the present invention. A person skilled in the art would recognize that lift height adjustment plate 38 could alternatively be an angle or L-shape bracket wherein one side is bolted or welded to bumper connection bracket 36. In an alternative embodiment, the adjustment of the lift height may achieved using a plate or a bracket with only one vertically orientated attachment position 50 wherein the plate or bracket can be operably connected to bumper frame 36 at a minimum of two different vertical positions along the height of bumper frame 36.

Now turning to FIG. 5, an embodiment of the present invention is shown where the bumper frame further includes a C-shaped spacer channel 66 to vary the vertical height 76 of bumper frame 36 in order to facilitate the use of flip-up bumper assembly 10 with bumper 22 having a depth greater than the depth of right and left bumper connection brackets 36a,b. The embodiment illustrated in FIG. 5 comprises right and left bumper connection brackets 36a,b fabricated to properly support an aftermarket bumper with a depth of about 20"; however, C-shaped spacer channel 66 allows right and left bumper connection brackets 36a,b to fully and properly support an aftermarket bumper 70 with a depth of about 22". This embodiment allows for flip-up bumper assembly 10 to be universally manufactured such that it can be used to support and "flip-up" at least two commonly used sizes of aftermarket bumpers.

Alternatively, bumper frame 36 may comprise at least two sections which vertically slide relative to each other having sufficient overlap to allow the installer adjust the depth of bumper frame 36 to match the depth of bumper 22. This alternative embodiment of flip-up bumper assembly 10 can be adjusted for use with at least three commonly known bumper depths including but not limited to an OEM bumper depth of around 16" (not shown), an aftermarket bumper depth of about 20" (not shown), and an about 22" deep aftermarket bumper 70 (FIG. 5). Obviously, a person skilled in the art would recognize that a bumper of any depth could be used and that bumper adaption channel 66 or other equivalent method to vary the vertical height 76 of bumper frame 36 to facilitate the attachment of almost any size bumper.

Bumper 22 can be an aftermarket or OEM bumper. Aftermarket bumpers with depths of about 20 inches and about 22 inches are commonly used. Generally, bumper 22 is coupled to the flip-up bumper assembly 10 such that a inner surface 78 of bumper 22 is generally orientated toward the vehicle body and a outer surface 80 is the exposed face and generally orientated away from the vehicle body. FIG. 5 demonstrates one embodiment of flip-up bumper assembly 10 using C-shaped spacer channel 66 and 22" aftermarket bumper 70. In this embodiment, aftermarket bumper 70 is coupled to bumper connection brackets 36a,b with four bolts 72. One bolt 72 is located at attachment point 49 on flange 48 of top side 44 of both right bumper connection bracket 36a and left bumper connection bracket 36b and one bolt 72 at is located at attachment point 49 at flange 48 of bottom side 46 of both right bumper connection bracket 36a and left bumper connection bracket 36b. This configuration provides a clean, "hidden bolt" look currently desirable by motor vehicle owners using aftermarket bumpers. However, the present invention should not be limited to the "hidden bolt" embodiment described above and a person of ordinary skill in the art will appreciate that bumper 22 can be coupled to bumper frame 36 in any manner or at any location that provides adequate structural support.

FIG. 2 demonstrates an embodiment of flip-up bumper assembly 10 that may be used with an OEM bumper. An OEM bumper is coupled to bumper frame by replicating OEM bolt pattern 74 of the OEM bumper on bumper connection brackets 36a,b. Generally, coupling throughout the present invention is achieved using bolts, however, any other coupling technique known in the art, such as rivets, clamps, compression assemblies, welds, sleeves, magnets, screws, threaded studs may be utilized.

After flip-up bumper assembly 10 is fully assembled and coupled to the vehicle, the vehicle can be driven over the road with bumper 22 in lowered position as seen in FIG. 6. When a vehicle utilizing flip up bumper assembly 10 needs to traverse over a curb or other road surface that contains obstacles in the road with a greater height than the ground clearance of bumper 22, the vehicle operator can engage air cylinder 58 causing bottom of the bumper 22 to "flip up" and out into a raised position as shown in FIG. 7. The "flip-up" of bumper 22 creates the clearance required to navigate the curb or obstacle without damaging bumper 22. The owner can select which lift height is generally needed for the owner's particular use by selecting the desired vertically orientated attachment position 50 of lift height adjustment plate 38 and if the owner's needs change, the lift height can be adjusted at will throughout the life of the flip-up bumper assembly 10. One embodiment employs an air cylinder 58 electronically controlled by a switch (not shown) inside the passenger compartment of the vehicle. The switch facilitates electronically triggering the extension of air cylinder 58. A person skilled in the art, however, would recognize that the extension of air cylinder 58 may be accomplished through a variety of manual, electrical, hydraulic or other automated processes.

In general, flip-up bumper assembly 10 will be fabricated from steel or aluminum plate or shapes. Alternatively, any material which provides the structural properties and meets known standards within the art can be utilized in this invention including, but not limited to, composite plastics, fiberglass, and carbon-fiber composites.

Having described the invention in detail, those skilled in the art will appreciate that modifications may be made of the invention without departing from its spirit and scope. Therefore, it is not intended that the scope of the invention be limited to the specific embodiments described.

The invention claimed is:

1. A flip-up bumper assembly for a motor vehicle comprising:
   at least one attachment assembly coupled to the motor vehicle;
   a support member coupled to at least one said attachment assembly;
   a bumper frame operably connected to said support member;
   a lift height adjustment member having a plurality of vertically orientated attachment positions wherein said lift height adjustment member is operably connected to said bumper frame; and
   at least one extendable member including a first end and a second end, wherein said first end of said extendable member is operably connected to said attachment assembly and said second end of said extendable member is operably connected to said lift height adjustment member at one of said vertically orientated attachment positions;
   wherein said bumper frame has a vertical height and wherein said vertical height of said bumper frame is variable;
   wherein said bumper frame further having a top side and a bottom side and wherein a bumper having an inner surface may be coupled to said bumper frame and wherein said vertical height of said bumper frame is set such that said top side and said bottom side of said bumper frame are proximate to said inner surface of said bumper;
   wherein said bumper frame further includes at least one C-shaped spacer channel and wherein said vertical height of said bumper frame is varied using at least one C-shaped spacer channel.

2. The flip-up bumper assembly for a motor vehicle of claim 1 further comprising at least one pivot member wherein said pivot member is operably connected to said support member and said bumper frame.

3. The flip-up bumper assembly for a motor vehicle of claim 1 wherein said bumper frame further includes a right bumper connection bracket and a left bumper connection bracket.

4. The flip-up bumper assembly for a vehicle of claim 1 wherein said attachment assembly includes a frame bolt, a connection plate and a link bar.

5. The flip-up bumper assembly for a motor vehicle of claim 1 wherein said extendable member is an air cylinder.

6. A flip-up bumper assembly for a motor vehicle comprising:
- at least one attachment assembly coupled to the motor vehicle;
- a support member coupled to said at least one attachment assembly;
- a bumper frame having a vertical height wherein said vertical height is variable, and said bumper frame is operably connected to said support member;
- a lift height adjustment member having a plurality of vertically orientated attachment positions wherein said lift height adjustment member is operably connected to said bumper frame; and
- at least one extendable member including a first end and a second end, wherein said first end of said extendable member is operably connected to said attachment assembly and said second end of said extendable member is operably connected to said lift height adjustment member at one of said vertically orientated attachment positions;
- wherein said bumper frame includes at least one C-shaped spacer channel and wherein said vertical height of said bumper frame is varied using at least one C-shaped spacer channel.

7. The flip-up bumper assembly for a motor vehicle of claim 6 wherein said bumper frame further has a top side and a bottom side and wherein a bumper having an inner surface may be coupled to said bumper frame and wherein said vertical height of said bumper frame is set such that said top side and said bottom side of said bumper frame are proximate to said inner surface of said bumper.

8. The flip-up bumper assembly for a vehicle of claim 6 wherein said bumper frame includes a right bumper connection bracket and a left bumper connection bracket.

9. The flip-up bumper assembly for a vehicle of claim 6 wherein said extendable member is an air cylinder.

10. The flip-up bumper assembly for a vehicle of claim 6 wherein said attachment assembly includes a frame bolt, a connection plate and a link bar.

11. A method for flipping up a bumper comprising:
- providing a flip up bumper assembly coupled to a vehicle, wherein said flip-up bumper assembly includes at least one attachment assembly, a support member, a bumper frame having a vertical height wherein said vertical height is variable, and an extendable member having a first end and a second end;
- coupling a bumper to said flip-up bumper assembly; and
- extending said second end of said extendable member causing said flip-up bumper assembly to angularly rotate about at least one pivot point to move said bumper from a lowered position to a raised position;
- wherein said bumper frame further comprises a C-shaped spacer channel and wherein said vertical height of said bumper frame is adjusted using said C-shaped spacer channel.

12. A flip-up bumper assembly for a motor vehicle comprising:
- a right attachment assembly including a frame bolt, a connection bracket, and a link bar wherein said frame bolt couples said connection bracket to said motor vehicle and said link bar is operably connected to said connection bracket;
- a left attachment assembly including a frame bolt, a connection bracket, and a link bar wherein said frame bolt couples said connection bracket to said motor vehicle and said link bar is operably connected to said connection bracket;
- a support member including a plate beam, wherein said plate beam includes a right end and a left end wherein said right end of said support member is operably connected to said right link bar and said left end of said support member is operably connected to said left link bar;
- a bumper frame having a right side, a left side, a top side, a bottom side, an inside face, an outside face, and a vertical height wherein said vertical height is variable and said bumper frame includes a C-Shaped channel and said bumper frame is operably connected to said support member;
- a right lift height adjustment member having at least two vertically orientated attachment positions, wherein said right lift height adjustment member is operably connected to said inside face of said bumper frame;
- a left lift height adjustment member having at least two vertically orientated attachment positions, wherein said left lift height adjustment member is operably connected to said inside face of said bumper frame; and
- a first extendable member having a first end and a second end, wherein said first end of said first extendable member is operably connected to said connection plate of said right attachment assembly and said second end of said first extendable member is operably connected to said right lift height adjustment plate; and
- a second extendable member having a first end and a second end, wherein said first end of said second extendable member is operably connected to said connection plate of said left attachment assembly and said second end of said second extendable member is operably connected to said left lift height adjustment plate.

* * * * *